(12) United States Patent
Forsberg

(10) Patent No.: US 9,772,016 B2
(45) Date of Patent: Sep. 26, 2017

(54) TRANSMISSION SYSTEM FOR A MOTOR VEHICLE

(71) Applicant: SCANIA CV AB, Södertälje (SE)

(72) Inventor: Jörgen Forsberg, Mariefred (SE)

(73) Assignee: SCANIA CV AB (SE)

( * ) Notice: Subject to any disclaimer, the term of this patent is extended or adjusted under 35 U.S.C. 154(b) by 248 days.

(21) Appl. No.: 14/426,662

(22) PCT Filed: Sep. 9, 2013

(86) PCT No.: PCT/SE2013/051041
§ 371 (c)(1),
(2) Date: Mar. 6, 2015

(87) PCT Pub. No.: WO2014/042575
PCT Pub. Date: Mar. 20, 2014

(65) Prior Publication Data
US 2015/0226295 A1    Aug. 13, 2015

(30) Foreign Application Priority Data
Sep. 11, 2012 (SE) ........................................ 1251017

(51) Int. Cl.
*F16H 3/00*    (2006.01)
*F16H 37/04*    (2006.01)
(Continued)

(52) U.S. Cl.
CPC ........... *F16H 37/046* (2013.01); *F16H 3/006* (2013.01); *F16H 3/097* (2013.01); *F16H 3/16* (2013.01);
(Continued)

(58) Field of Classification Search
CPC ...... F16H 2003/008; F16H 3/006; F16H 3/18; F16H 3/16; F16H 2003/0822; F16H 2003/006
See application file for complete search history.

(56) References Cited

U.S. PATENT DOCUMENTS 746,597 A * 12/1903 Swenson .................. B65D 7/36
220/620
2,722,844 A * 11/1955 Dodge ....................... F16H 3/10
74/330
(Continued)

FOREIGN PATENT DOCUMENTS

WO    WO 98/17926 A1    4/1998
WO    WO 2011/069526 A1    6/2011
WO    WO 2011/123019 A1    10/2011

OTHER PUBLICATIONS

International Search Report dated Dec. 19, 2013 issued in corresponding International patent application No. PCT/SE2013/051041.
(Continued)

*Primary Examiner* — Stacey Fluhart
(74) *Attorney, Agent, or Firm* — Ostrolenk Faber LLP

(57) ABSTRACT

A transmission system for a motor vehicle includes two input shafts (11, 12), a mainshaft (15), an output shaft (5), a clutch arrangement (40) for connecting alternately the input shafts (11, 12), to a driveshaft, a first power transmission shaft (A1) provided with at least a first gearwheel (K1*b*) which is in engagement with a gearwheel (K17*a*) situated on either of the input shafts, and a second gearwheel (K3*a*) which is in engagement with a gearwheel (35*b*) situated on the mainshaft, and a second power transmission shaft (A1) provided with at least a first gearwheel (K4*b*) which is in engagement with a gearwheel (K4*a*) situated on either of the input shafts, and a second gearwheel (K5*a*) which is connected or connectable to the gearwheel (K35*b*) on the
(Continued)

mainshaft via an intermediate gearwheel (K5c) to allow the establishment of a power transfer path for a reverse gear via these gearwheels (K5a, K5c, K35b).

13 Claims, 6 Drawing Sheets

(51) Int. Cl.
    *F16H 3/097*     (2006.01)
    *F16H 3/16*     (2006.01)
    *F16H 3/08*     (2006.01)

(52) U.S. Cl.
    CPC ........... *F16H 2003/0822* (2013.01); *F16H 2200/0078* (2013.01); *F16H 2200/2005* (2013.01); *Y10T 74/19019* (2015.01)

(56) References Cited

U.S. PATENT DOCUMENTS

| | | | |
|---|---|---|---|
| 3,364,768 A * | 1/1968 | Powell | F16D 1/08 |
| | | | 74/339 |
| 4,463,621 A * | 8/1984 | Fisher | F16H 3/006 |
| | | | 192/48.6 |
| 4,548,101 A * | 10/1985 | Akashi | F16H 3/006 |
| | | | 74/330 |
| 4,802,375 A | 2/1989 | Stodt | |
| 2004/0144190 A1 | 7/2004 | Hall, III | |
| 2006/0025272 A1 | 2/2006 | Pelouch | |
| 2006/0048594 A1 * | 3/2006 | Gumpoltsberger | F16H 3/006 |
| | | | 74/331 |
| 2006/0117882 A1 * | 6/2006 | Gitt | F16H 3/006 |
| | | | 74/340 |
| 2008/0202267 A1 | 8/2008 | Hendrickson et al. | |
| 2009/0203482 A1 * | 8/2009 | Earhart | F16H 3/006 |
| | | | 475/207 |
| 2009/0280955 A1 * | 11/2009 | Dittrich | F16H 37/042 |
| | | | 477/79 |
| 2010/0288064 A1 | 11/2010 | Singh et al. | |

OTHER PUBLICATIONS

International Preliminary Report on Patentability dated Dec. 15, 2014 issued in corresponding International patent application No. PCT/SE2013/051041.

* cited by examiner

TRANSMISSION SYSTEM FOR A MOTOR VEHICLE

CROSS-REFERENCE TO RELATED APPLICATIONS

The present application is a 35 U.S.C. §§371 national phase conversion of PCT/SE2013/051041, filed Sep. 9, 2013, which claims priority of Swedish Patent Application No. 1251017-8, filed Sep. 11, 2012, the contents of which are incorporated by reference herein. The PCT International Application was published in the English language.

FIELD OF THE INVENTION AND PRIOR ART

The present invention relates to a transmission system for a motor vehicle.

Heavy motor vehicles, e.g. trucks, tractor units and buses, are often provided with an automatically operated manual transmission which can be regulated by the vehicle driver via an electronic control device by using an operating means in the form of a gear lever or the like. The driver can, as desired, either order gear changes in the transmission manually by using the operating means or allow the electronic control device to automatically take care of choosing appropriate gears in the transmission. In either case the operations involved in a change of gear in the transmission are directed by the electronic control device in a preprogrammed way depending on the gears between which the change is to take place.

An automatically operated manual transmission is provided with a main gear unit comprising a mainshaft and a parallel countershaft, and is often also provided with a range gear unit which can be put into a low-range state and a high-range state. To this end, the mainshaft can be connected to an input shaft of the transmission via the countershaft and to an output shaft of the transmission via the range gear unit. The range gear unit provides a higher gear ratio in the high-range state than in the low-range state.

To prevent torque interruptions during changes of gear position in the main gear unit, so-called twin-clutch gearboxes have been developed. A twin-clutch gearbox has a first input shaft connectable to the driveshaft of an engine by means of a first clutch, and a second input shaft connectable to the engine's driveshaft by means of a second clutch. A first set of power transfer paths with mutually different gear ratios can be established between the engine's driveshaft and the mainshaft of the main gear unit via the first input shaft, and a second set of power transfer paths with mutually different gear ratios can be established between the engine's driveshaft and the mainshaft of the main gear unit via the second input shaft. The two input shafts are connected alternately to the engine's driveshaft via said first and second clutches, making it possible for the two different sets of power transfer paths to be employed alternately, one after the other. It thus becomes possible to effect stepped upshifts and downshifts in the main gear unit without torque interruptions, i.e. without breaking the power transfer between the engine's driveshaft and the transmission's output shaft.

A twin-clutch gearbox may be provided with two countershafts as for example in US 2006/0025272 A1, or with a single countershaft as for example in WO 2011/069526 A1.

In a twin-clutch gearbox of conventional type, the gearbox is provided with a gear combination which is specially configured for engagement of a reverse gear. This gear combination comprises a gearwheel situated on a countershaft and connected via an intermediate gearwheel to a gearwheel situated on the mainshaft. This gear combination can be used to set up a reversing power transfer path between one of the input shafts and the mainshaft in such a way that the mainshaft is caused to rotate in an opposite direction to that of the input shaft. To this end, either the gearwheel situated on the countershaft or the gearwheel situated on the mainshaft is journalled for rotation on the respective shaft but can be connected to, for joint rotation with, said shaft by means of a clutch device situated on this shaft in order to set up said reversing power transfer path.

OBJECT OF THE INVENTION

The object of the present invention is to propose a transmission system which is of the kind indicated in the introduction but is of novel and advantageous configuration.

SUMMARY OF THE INVENTION

The present invention achieves said object by means of a transmission system presenting the features disclosed herein.

The transmission system according to the invention comprises
first and second input shafts which are mutually coaxial,
a mainshaft,
an output shaft connected to the mainshaft,
a clutch arrangement for alternately connecting said input shafts to a driveshaft,
a first power transmission shaft provided with at least a first gearwheel which is in engagement with a second gearwheel situated on either of the input shafts, and a third gearwheel which is in engagement with a fourth gearwheel situated on the mainshaft, and
a second power transmission shaft parallel with the first power transmission shaft and provided with at least a fifth gearwheel which is in engagement with a sixth gearwheel situated on either of the input shafts, and a seventh gearwheel which is connected or connectable to said fourth gearwheel on the mainshaft via an eighth intermediate gearwheel to allow the establishment of a power transfer path for a reverse gear via these gearwheels.

Said seventh gearwheel on the first power transmission shaft, said fourth gearwheel on the mainshaft and said third gearwheel on the second power transmission shaft are all arranged in a single row of gearwheels, and this row of gearwheels can be used both for a forward gear and for a reverse gear. When this row of gearwheels is used for a forward gear, a power transfer path is set up between the first power transmission shaft and the mainshaft via said third gearwheel on the first power transmission shaft and said fourth gearwheel on the mainshaft, and when this row of gearwheels is used for a reverse gear a reversing power transfer path is set up between the second power transmission shaft and the mainshaft via said seventh gearwheel on the second power transmission shaft, the eighth intermediate gearwheel and said fourth gearwheel on the mainshaft. The solution according to the invention thus makes it possible for one of the rows of gearwheels which is used for a forward gear to be used also for a reverse gear, which means that the transmission system need not be provided with a separate row of gearwheels used only for engaging a reverse gear and can be configured in a space-saving way with a relatively short extent in the axial direction.

One embodiment of the invention is characterised
in that the eighth intermediate gearwheel is movable relative to said seventh gearwheel on the second power transmission shaft and said fourth gearwheel on the mainshaft, and that the transmission system comprises an operating device by means of which the eighth intermediate gearwheel can be moved to and fro between a disconnecting state in which the eighth intermediate gearwheel is disconnected from said seventh gearwheel on the second power transmission shaft and/or from said fourth gearwheel on the mainshaft, and a connecting state in which the eighth intermediate gearwheel is in engagement with said seventh gearwheel on the second power transmission shaft and said fourth gearwheel on the mainshaft.

The operating device can be used to put the eighth intermediate gearwheel into engagement with the respective gearwheels on the second power transmission shaft and the mainshaft for engagement of reverse gear, and thereafter to take it out of engagement with them when the reverse gear is to be disconnected. When the eighth intermediate gearwheel is in the disconnecting state, the fourth gearwheel situated on the mainshaft is not connected to said seventh gearwheel on the second power transmission shaft, making it possible for the fourth gearwheel situated on the mainshaft to be used to engage a forward gear.

In another embodiment of the invention, the eighth intermediate gearwheel is fixed axially on a movable intermediate wheel shaft which the operating device is arranged to move in axial directions and thereby move the eighth intermediate gearwheel between said states. In this case the operating device comprises with advantage a pneumatic or hydraulic cylinder, and the intermediate wheel shaft is connected to a piston rod of said cylinder, thus providing an easy way of moving the eighth intermediate gearwheel between the disconnecting and connecting states.

In another embodiment of the invention, said seventh gearwheel on the second power transmission shaft is journalled for rotation on said power transmission shaft but can be connected to, for joint rotation with, said shaft by means of a clutch device situated on this shaft. This clutch device can be used to put the seventh gearwheel situated on the second power transmission shaft into engagement with, for joint rotation with, said shaft for engagement of reverse gear, and thereafter to disconnect it from this shaft when the reverse gear is to be disengaged. When this latter gearwheel is disconnected from the second power transmission shaft, the fourth gearwheel situated on the mainshaft will not be in power-transmitting communication with the second power transmission shaft, making it possible for the fourth gearwheel situated on the mainshaft to be used to engage a forward gear.

Another embodiment of the invention is characterised
in that the first power transmission shaft takes the form of a countershaft of the transmission system, and
that the second power transmission shaft takes the form of a bypass shaft via which at least one of the input shafts can be connected to the output shaft to establish a power transfer path from said input shaft to the output shaft without passing through a range gear unit which forms part of the transmission system.

This makes it possible to avoid torque interruptions during gear changes which entail a change of gear position in the range gear unit from low-range state to high-range state or vice versa, by, in conjunction with such a change of gear position, bypassing the range gear unit by means of the second power transmission shaft and thus putting the range gear unit into an off-load state, while at the same time the second power transmission shaft can on another occasion be used to engage a reverse gear. When the vehicle is running with the highest gear in the low-range state engaged, a first input shaft is connected to the engine's driveshaft and is in power-transmitting communication with the output shaft via the range gear unit, while the second input shaft is disconnected from the engine's driveshaft. When an upshift is to take place from the highest gear in the low-range state to the lowest gear in the high-range state, said second input shaft is put into power-transmitting communication with the output shaft via the bypass shaft, followed by this input shaft being connected to the engine's driveshaft while at the same time said first input shaft is disconnected from the engine's driveshaft. In this situation, with the range gear unit off load, a change of gear position takes place in the range gear unit from low-range state to high-range state while at the same time a power transfer path from the now disconnected first input shaft to the mainshaft is established which corresponds to the lowest gear in the high-range state. Thereafter said first input shaft is connected to the engine's driveshaft while at the same time said second input shaft is disconnected from the engine's driveshaft. The opposite process applies during downshifts from the lowest gear in the high-range state to the highest gear in the low-range state.

BRIEF DESCRIPTION OF THE DRAWINGS

The invention is described in more detail below on the basis of embodiment examples with reference to the attached drawings, in which.

DETAILED DESCRIPTION OF EMBODIMENTS OF THE INVENTION

Figure 1:
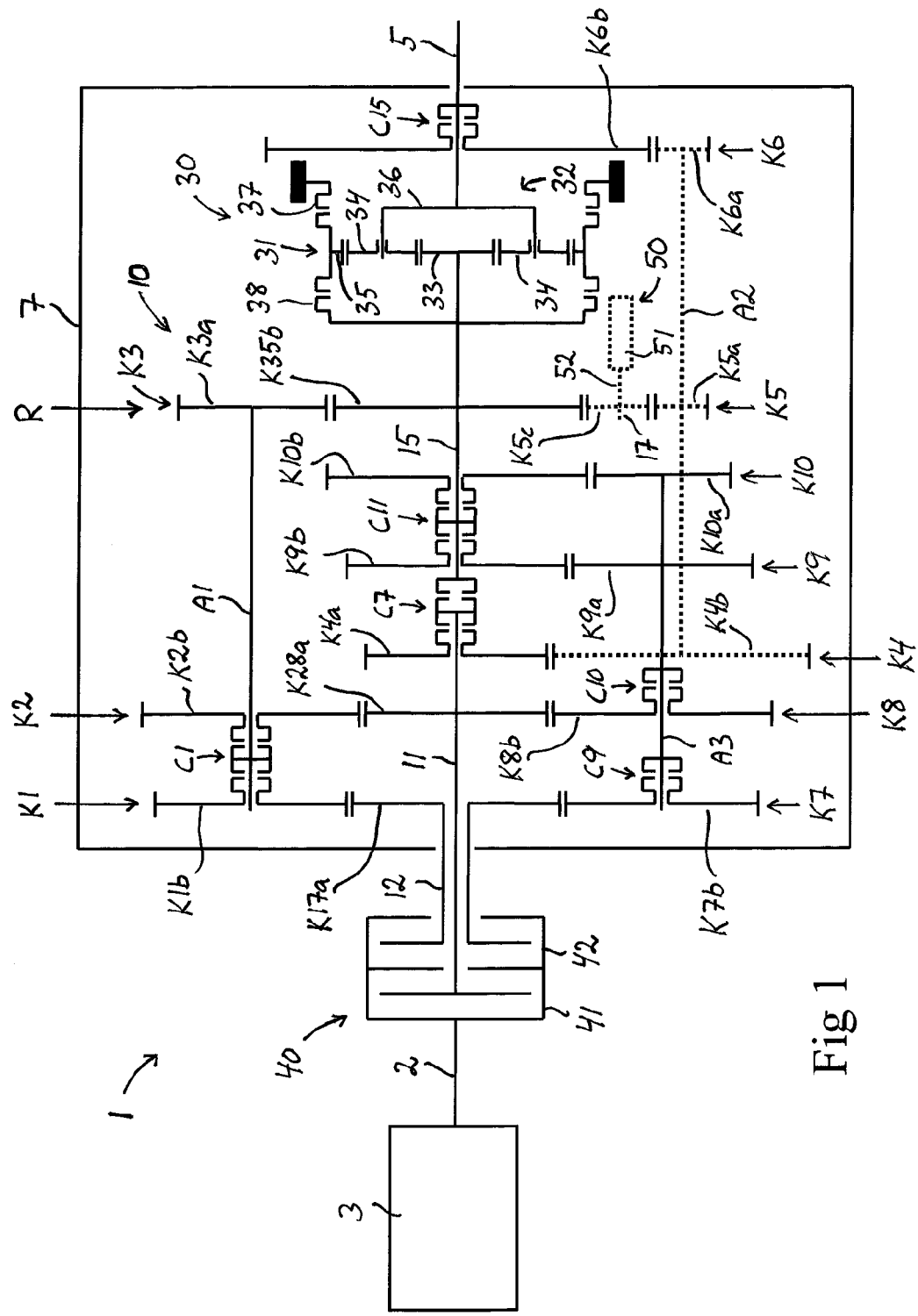
FIG. 1 is a schematic diagram of a transmission system according to a first embodiment of the present invention, showing the aforesaid intermediate gearwheel in a connecting state.
Figure 2:
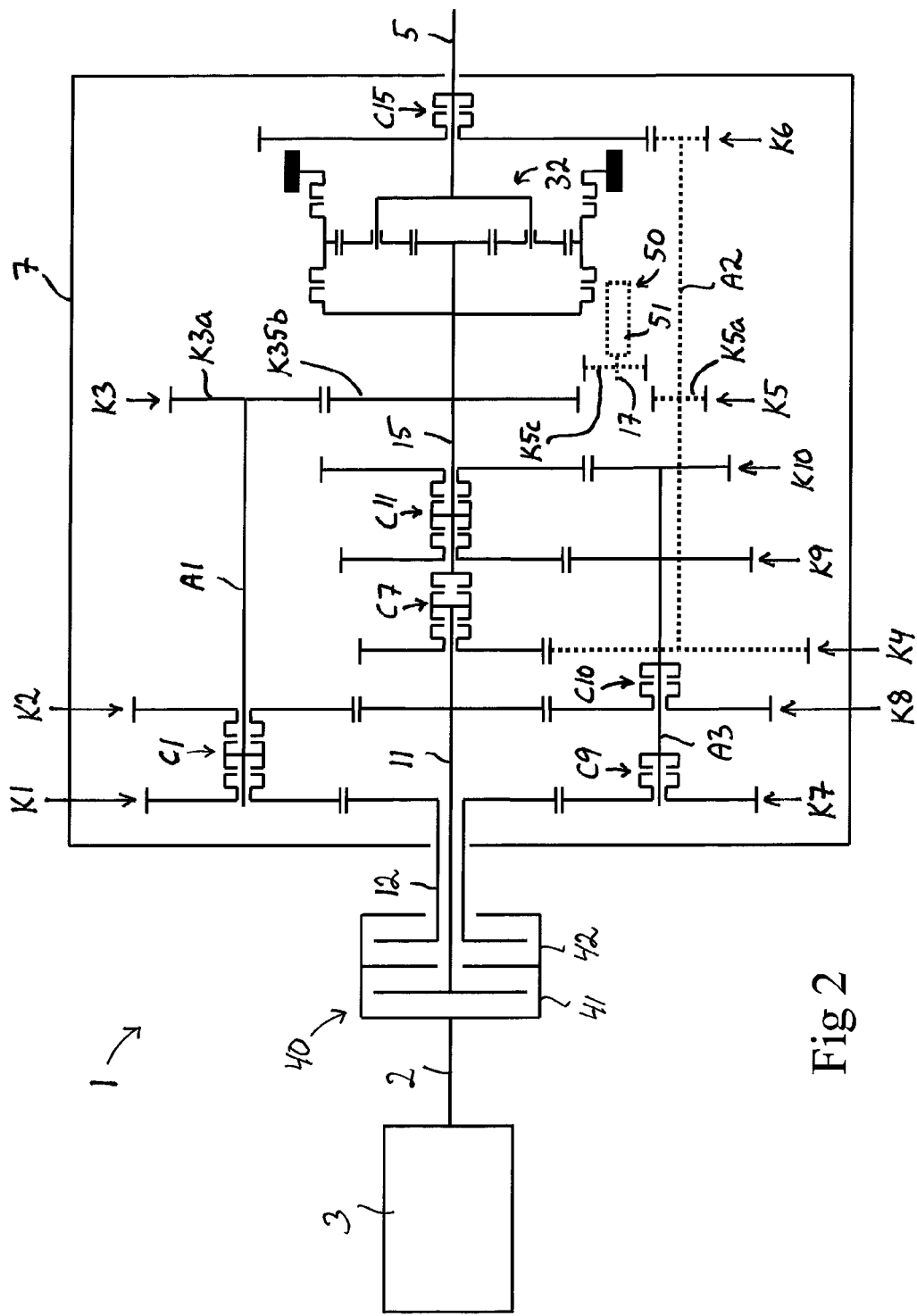
FIG. 2 is a schematic diagram corresponding to FIG. 1, but showing the intermediate gearwheel in a disconnecting state.
Figure 3:
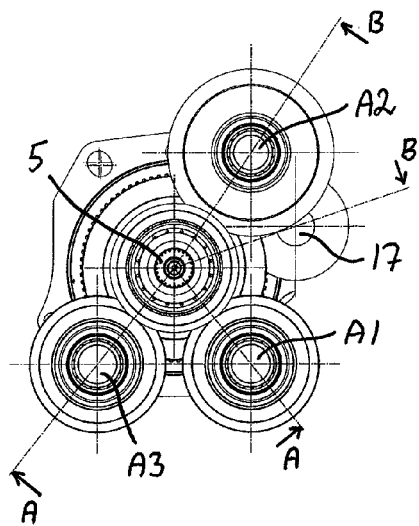
FIG. 3 is a schematic front view of parts of a transmission system according to FIG. 1.
Figure 4:
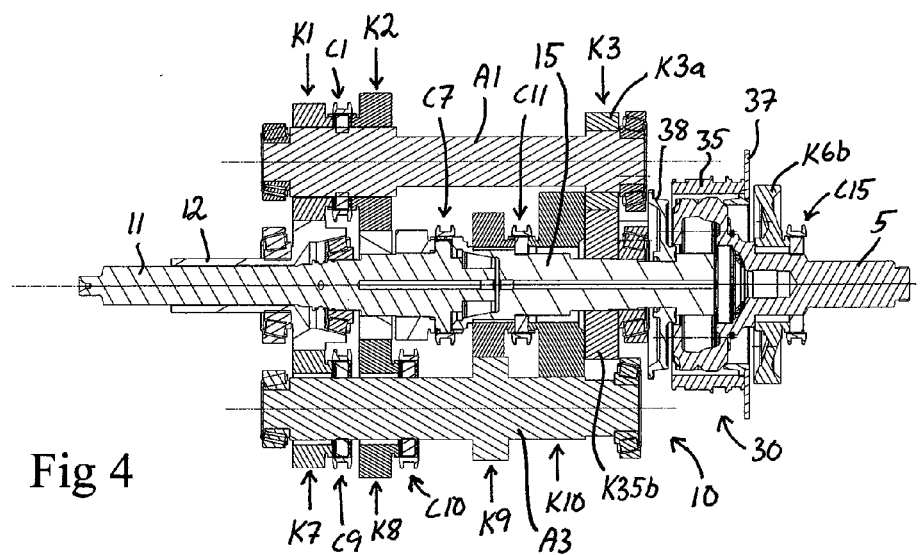
FIG. 4 is a section along the lines A-A in FIG. 3.
Figure 5:
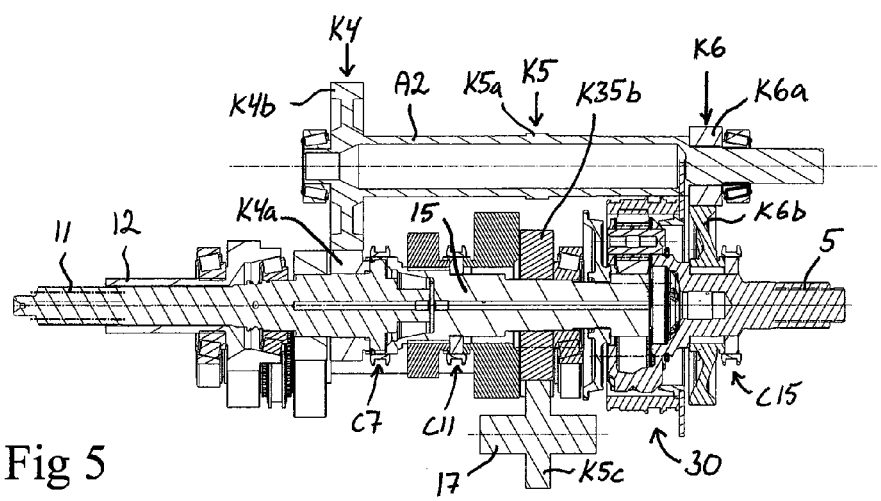
FIG. 5 is a section along the lines B-B in FIG. 3.

FIGS. 1, 2 and 6-8 illustrate very schematically a transmission system 1 for a motor vehicle according to various embodiments of the present invention. Some of the parts of the transmission system in the embodiment illustrated in FIGS. 1 and 2 are depicted in more detail in FIGS. 3-5.

The transmission system 1 comprises a twin-clutch main gear unit 10 and a range gear unit 30. The range gear unit can be put into a low-range state and a high-range state by means of a clutch arrangement 31 which may be provided with synchronising means of known type. The main gear unit 10 comprises a first input shaft 11 and a second input shaft 12 which are mutually parallel and coaxial. The first input shaft 11 extends axially through the second input shaft 12, which is thus situated externally to the first input shaft. The main gear unit 10 comprises also a mainshaft 15 connected via the range gear unit 30 to an output shaft 5 of the transmission system. In the example illustrated the mainshaft 15 and the first input shaft 11 are mutually coaxial.

The transmission system 1 comprises a clutch arrangement 40 for alternate connection of the input shafts 11, 12. This clutch arrangement can be used to connect the input shafts alternately to a driveshaft 2 of a prime mover 3. It comprises a first clutch device 41 by means of which the first input shaft can be put into power-transmitting communication with and be disconnected from the driveshaft 2, and a second clutch device 42 by means of which the second input shaft 12 can be put into power-transmitting communication with and be disconnected from the driveshaft.

In the embodiments illustrated, the range gear unit 30 comprises a planetary gear 32 with a sunwheel 33, planet wheels 34 and a ring gear 35. The planet wheels surround and are in engagement with the sunwheel, while the ring gear surrounds and is in engagement with the planet wheels. The sunwheel is connected to, for joint rotation with, the mainshaft 15. The planet wheels are journalled for rotation in a planet wheel carrier 36 which is connected to, for joint rotation with, the transmission's output shaft 5. The ring gear 35 has internal teeth via which it engages with the planet wheels. The ring gear is movable axially and serves as a connecting means which can be used to put the range gear unit into a low-range state and a high-range state.

By being moved in a first direction the ring gear 35 can be connected to, for joint rotation with, a first clutch means 37 which is connected to, for joint rotation with, a gearbox housing 7, thereby preventing rotation of the ring gear. In this low-range state the planet wheels 34 rotate jointly with the planet wheel carrier 36 relative to the sunwheel 32 and the ring gear 35, and the output shaft 5 rotates at a slower speed than the mainshaft 15.

By being moved in an opposite second direction the ring gear 35 can be connected to, for joint rotation with, a second clutch means 38 which is connected to, for joint rotation with, the mainshaft 15, causing the ring gear to rotate jointly with the mainshaft. In this high-range state the planet wheels 34 and the planet wheel carrier 36 are prevented from rotating relative to the sunwheel 33 and the ring gear 35, and the output shaft 5 consequently rotates at the same speed as the mainshaft 15.

As an alternative, the ring gear 35 might be fixed axially and be in engagement with a coupling sleeve surrounding it which is movable axially for change of gear position in the range gear unit 30 between said low-range state and high-range state.

The transmission system 1 comprises a first power transmission shaft A1 and a second power transmission shaft A2 each configured to convey power from at least one of the first and second input shafts 11, 12 to the mainshaft 15. The first and second power transmission shafts A1, A2 are mutually parallel and are also parallel with the first and second input shafts 11, 12 and the mainshaft 15.

In all the embodiments illustrated the transmission system 1 comprises
- a first gear combination K1 to convey power from the second input shaft 12 to the first power transmission shaft A1,
- a second gear combination K2 to convey power from the first input shaft 11 to the first power transmission shaft A1,
- a third gear combination K3 to convey power from the first power transmission shaft A1 to the mainshaft 15,
- a fourth gear combination K4 to convey power from the first input shaft 11 to the second power transmission shaft A2, and
- a fifth gear combination K5 to convey power from the second power transmission shaft A2 to the mainshaft 15.

In the embodiments in FIGS. 1-6 and 8 the first gear combination K1 comprises a second gearwheel K17*a*, K17*a*" situated on, for joint rotation with, the second input shaft 12, and a first gearwheel K1*b* journalled for rotation on the first power transmission shaft A1. This latter gearwheel K1*b* is in engagement with said second gearwheel K17*a*, K17*a*" and can be connected to, for joint rotation with, the first power transmission shaft A1 by means of a clutch device C1 situated on this shaft.

Figure 7:
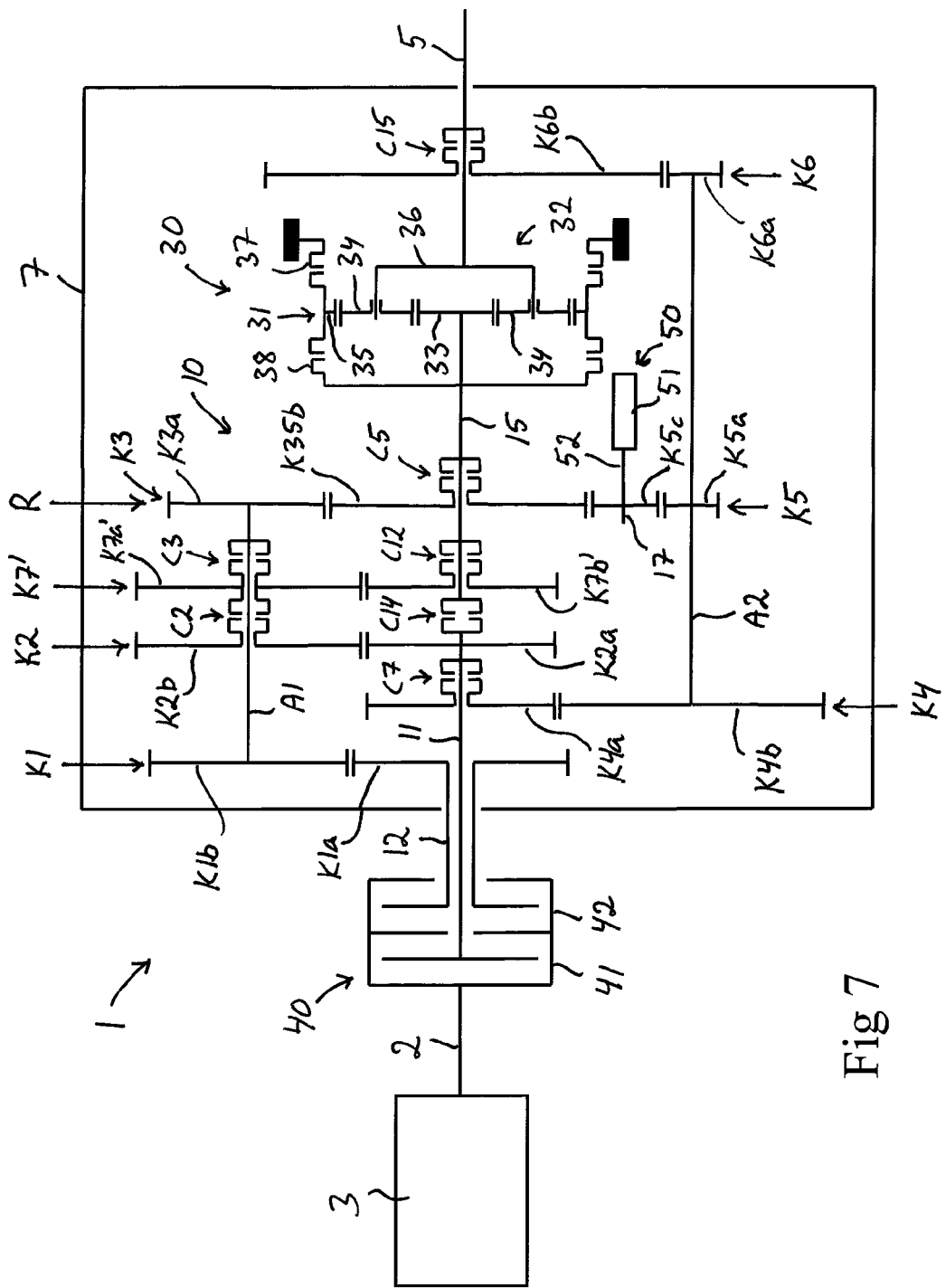
FIG. 7 is a schematic diagram of a transmission system according to a third embodiment of the present invention.

In the embodiment in FIG. 7, the first gear combination K1 comprises a second gearwheel K1*a* situated on, for joint rotation with, the second input shaft 12, and a first gearwheel K1*b* situated on, for joint rotation with, the first power transmission shaft A1. This latter gearwheel K1*b* is in engagement with said second gearwheel K1*a*.

Figure 8:
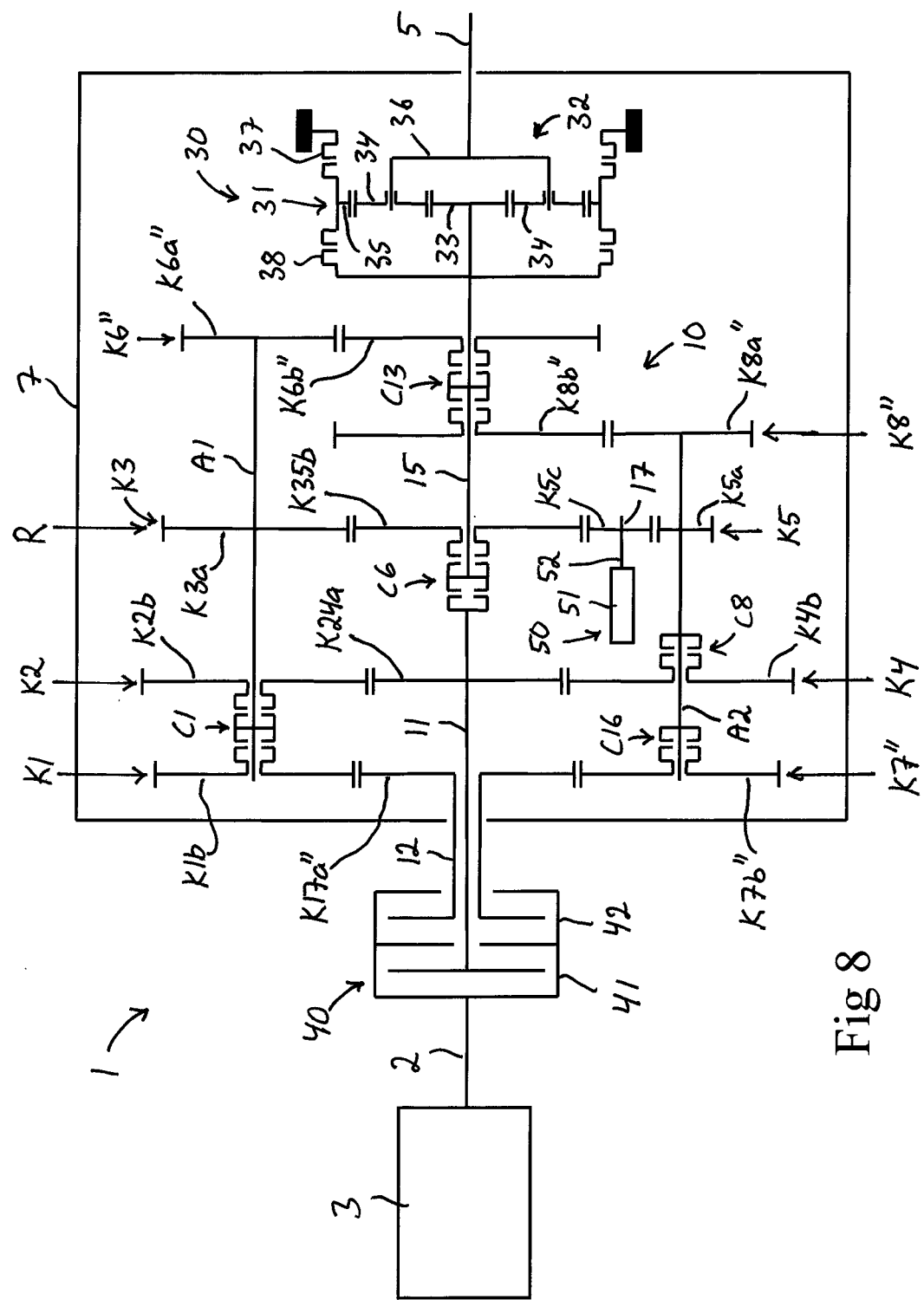
FIG. 8 is a schematic diagram of a transmission system according to a fourth embodiment of the present invention.

The second gear combination K2 comprises in the embodiment in FIGS. 1-6 a gearwheel K28*a*, in the embodiment in FIG. 7 a gearwheel K2*a* and in the embodiment in FIG. 8 a gearwheel K24*a* situated on, for joint rotation with, the first input shaft 11, and a gearwheel K2*b* journalled for rotation on the first power transmission shaft A1. This latter gearwheel K2*b* is in engagement with said gearwheel K2*a* in the embodiment in FIG. 7. In the embodiments in FIGS. 1-6 and 8 the gearwheel K2*b* can be connected to, for joint rotation with, the first power transmission shaft A1 by means of the aforesaid clutch device C1, and in the embodiment in FIG. 7 it can be connected to, for joint rotation with, the first power transmission shaft A1 by means of two clutch devices C2, C3 situated on this shaft.

The third gear combination K3 comprises a third gearwheel K3*a* situated on, for joint rotation with, the first power transmission shaft A1, and the fifth gear combination K5 comprises a seventh K5*a* situated on the second power transmission shaft A2. In the embodiments in FIGS. 1-5, 7 and 8 this latter gearwheel K5*a* is situated on, for joint rotation with, the second power transmission shaft A2. In the embodiment in FIG. 6 this latter gearwheel K5*a* is journalled for rotation on the second power transmission shaft A2 but can be connected to, for joint rotation with, said shaft by means of a clutch device C4 situated on this shaft. The third and fifth gear combinations K3, K5 further have in common a fourth gearwheel K35*b* which is situated on the mainshaft 15 and in engagement with the third gearwheel K3*a* of the third gear combination K3. In the embodiments in FIGS. 1-6 the fourth gearwheel K35*b* is situated on, for joint rotation with, the mainshaft 15. In the embodiments in FIGS. 7 and 8 it is journalled for rotation on the mainshaft 15 but can be connected to, for joint rotation with, the mainshaft by means of a clutch device C5, C6 situated on this shaft. The fifth gear combination K5 comprises also an eighth intermediate gearwheel K5*c* via which the seventh gearwheel K5*a* of the fifth gear combination K5 is in engagement with said fourth gearwheel K35*b*. The eighth intermediate gearwheel K5*c* is arranged for rotation by being journalled for rotation on a shaft 17 which is connected to, for joint rotation with, the gearbox housing 7, or by being situated on, for joint rotation with, a shaft which is journalled for rotation relative to the gearbox housing. The fifth gear combination K5 constitutes a reverse gear. The gearwheels of the third gear combination K3 and those of the fifth gear combination K5 are arranged in a common row R. This gearwheel row R may be used both to establish a power transfer path for a forward gear via the third gear combination K3 and to establish a power transfer path for a reverse gear via the fifth gear combination K5.

In the embodiments in FIGS. 1-7, the fourth gear combination K4 comprises a sixth gearwheel K4a journalled for rotation on the first input shaft 11, and a fifth gearwheel K4b situated on, for joint rotation with, the second power transmission shaft A2. This sixth gearwheel K4a is in engagement with the fifth gearwheel K4b and can be connected to, for joint rotation with, the first input shaft 11 by means of a clutch device C7 situated on this shaft.

In the embodiment in FIG. 8, the fourth gear combination K4 and the second gear combination K2 have in common a sixth gearwheel K24a situated on, for joint rotation with, the first input shaft 11. In this case the fourth gear combination K4 further comprises a fifth gearwheel K4b journalled for rotation on the second power transmission shaft A2. This latter gearwheel K4b is in engagement with said sixth gearwheel K24a and can be connected to, for joint rotation with, the second power transmission shaft A2 by means of a clutch device C8 situated on this shaft.

In the embodiments in FIGS. 1-7, the first power transmission shaft A1 takes the form of a countershaft of the main gear unit 10, while the second power transmission shaft A2 takes the form of a bypass shaft via which at least one of the input shafts 11, 12 can be connected to the output shaft 5 to establish a power transfer path from the respective input shaft to the output shaft without passing through the range gear unit 30 during changes of gear position in the range gear unit from the low-range state to the high-range state or from the high-range state to the low-range state. The transmission system comprises in this case a sixth gear combination K6 to convey power from the second power transmission shaft A2 to the output shaft 5. This sixth gear combination comprises a ninth gearwheel K6a situated on, for joint rotation with, the second power transmission shaft A2, and a tenth gearwheel K6b journalled for rotation on the output shaft 5. This latter gearwheel K6b is in engagement with said ninth gearwheel K6a and can be connected to, for joint rotation with, the output shaft by means of a clutch device C15 situated on this shaft. In the embodiments illustrated in FIGS. 1-7, the second power transmission shaft A2 extends past, and radially externally to, the planetary gear 32.

In the embodiments in FIGS. 1-6, the transmission system comprises also a third power transmission shaft A3 to convey power from at least one of the input shafts 11, 12 to the mainshaft 15. This third power transmission shaft A3 takes the form of a second countershaft of the main gear unit 10 and is parallel with first and second power transmission shafts A1, A2. The second power transmission shaft A2 and the other two power transmission shafts A1, A3 do not extend in a common plane, so the second power transmission shaft A2 is represented by broken lines in FIGS. 1, 2 and 6.

In the embodiments in FIGS. 1-6, the transmission system comprises not only the aforesaid gear combinations K1-6 but also
  a seventh gear combination K7 to convey power from the second input shaft 12 to the third power transmission shaft A3,
  an eighth gear combination K8 to convey power from the first input shaft 11 to the third power transmission shaft A3,
  a ninth gear combination K9 to convey power from the third power transmission shaft A3 to the mainshaft 15, and
  a tenth gear combination K10 to convey power from the third power transmission shaft A3 to the mainshaft 15.

The seventh gear combination K7 and the first gear combination K1 have in common a second gearwheel K17a situated on, for joint rotation with, the second input shaft 12. The seventh gear combination K7 further comprises a gearwheel K7b journalled for rotation on the third power transmission shaft A3. This latter gearwheel K7b is in engagement with said second gearwheel K17a and can be connected to, for rotation with, the third power transmission shaft A3 by means of a clutch device C9 situated on this shaft.

The eighth gear combination K8 and the second gear combination K2 have in common a gearwheel K28a which is situated on, for joint rotation with, the first input shaft 11. The eighth gear combination K8 further comprises a gearwheel K8b journalled for rotation on the third power transmission shaft A3. This latter gearwheel K8b is in engagement with said gearwheel K28a and can be connected to, for rotation with, the third power transmission shaft A3 by means of a clutch device C10 situated on this shaft.

The ninth gear combination K9 comprises a first gearwheel K9a situated on, for joint rotation with, the third power transmission shaft A3, and a second gearwheel K9b journalled for rotation on the mainshaft 15. This latter gearwheel K9b is in engagement with said first gearwheel K9a and can be connected to, for joint rotation with, the mainshaft 15 by means of a clutch device C11 situated on this shaft.

The tenth gear combination K10 comprises a gearwheel K10a situated on, for joint rotation with, the third power transmission shaft A3, and a gearwheel K10b journalled for rotation on the mainshaft 15. This latter gearwheel K10b is in engagement with said gearwheel K10a and can be connected to, for joint rotation with, the mainshaft 15 by means of the aforesaid clutch device C11.

In the embodiment illustrated in FIG. 7, the transmission system comprises not only the aforesaid gear combinations K1-K6 but also a seventh gear combination K7' to convey power from the first power transmission shaft A1 to the mainshaft 15. This seventh gear combination comprises a gearwheel K7a' journalled for rotation on the first power transmission shaft A1, and a gearwheel K7b' journalled for rotation on the mainshaft 15. This latter gearwheel K7b' is in engagement with the gearwheel K7a' and can be connected to, for joint rotation with, the mainshaft 15 by means of a clutch device C12 situated on this shaft. The gearwheel K7a' can be connected to, for joint rotation with, the first power transmission shaft A1 by means of the previously mentioned clutch device C3. The gearwheel K7a' can also be connected to, for joint rotation with, the gearwheel K2b of the second gear combination K2 by means of the previously mentioned clutch device C2.

In the embodiment illustrated in FIG. 8, the first power transmission shaft A1 takes the form of a first countershaft of the main gear unit 10, while the second power transmission shaft A2 takes the form of a second countershaft of the main gear unit. In this embodiment the transmission system comprises not only the aforesaid gear combinations K1-K5 but also
  a sixth gear combination K6" to convey power from the first power transmission shaft A1 to the mainshaft 15,
  a seventh gear combination K7" to convey power from the second input shaft 12 to the second power transmission shaft A2, and an eighth gear combination K8" to convey power from the second power transmission shaft A2 to the mainshaft 15.

The sixth gear combination K6" comprises a gearwheel K6a" situated on, for joint rotation with, the first power transmission shaft A1, and a gearwheel K6b" journalled for rotation on the mainshaft 15. This latter gearwheel K6b" is in engagement with said gearwheel K6a" and can be connected to, for joint rotation with, the mainshaft 15 by means of a clutch device C13 situated on this shaft.

The seventh gear combination K7" and the first gear combination K1 have in common a second gearwheel K17a" situated on, for joint rotation with, the second input shaft 12. The seventh gear combination K7" further comprises a gearwheel K7b" journalled for rotation on the second power transmission shaft A2. This latter gearwheel K7b" is in engagement with said second gearwheel K17a" and can be connected to, for rotation with, the second power transmission shaft A2 by means of a clutch device C9 situated on this shaft.

The eighth gear combination K8" comprises a gearwheel K8a" situated on, for joint rotation with, the second power transmission shaft A2, and a second gearwheel K8b" journalled for rotation on the mainshaft 15. This latter gearwheel K8b" is in engagement with said gearwheel K8a" and can be connected to, for joint rotation with, the mainshaft 15 by means of the aforesaid clutch device C13.

In the embodiments illustrated, the main gear unit 10 and the range gear unit 30 are enclosed in a shared gearbox housing 7 but each of them might alternatively be enclosed in a gearbox housing of its own. The first input shaft 11 is journalled for rotation relative to the second input shaft 12, while the second input shaft 12 and the output shaft 5 are journalled for rotation relative to, and protrude from opposite ends of, the gearbox housing 7. The power transmission shafts A1-A3 and the mainshaft 15 are also journalled for rotation relative to the gearbox housing 7. For the sake of clarity, the bearings via which the various shafts are journalled for rotation are not depicted in FIGS. 1, 2 and 6-8.

In the embodiments illustrated in FIGS. 1, 2, 7 and 8 the intermediate gearwheel K5c is movable relative to the other two gearwheels K5a, K35b of the fifth gear combination K5. The transmission system comprises in this case an operating device 50 which can be used to move the eighth intermediate gearwheel K5c axially to and fro between a disconnecting state (see FIG. 2) in which the eighth intermediate gearwheel K5c is disconnected from the seventh gearwheel K5a on the second power transmission shaft A2 and/or from the fourth gearwheel K35b on the mainshaft 15, and a connecting state (see FIGS. 1, 7 and 8) in which the eighth intermediate gearwheel K5c is in engagement with the seventh gearwheel K5a on the second power transmission shaft A2 and the fourth gearwheel K35b on the mainshaft 15. In the embodiments illustrated in FIGS. 1, 2, 7 and 8 the eighth intermediate gearwheel K5c is fixed axially on a movable intermediate wheel shaft 17 which the operating device 50 is arranged to move in axial directions and thereby move the eighth intermediate gearwheel K5c between the aforesaid states. In this case the operating device comprises with advantage a pneumatic or hydraulic cylinder 51 and the intermediate wheel shaft is connected to a piston rod 52 of this cylinder. The operating device might alternatively comprise an electric motor for moving the intermediate wheel shaft, e.g. via a ball screw which is rotatable by the electric motor. As a further alternative (not illustrated) the intermediate gearwheel might be movable on an axially fixed intermediate wheel shaft, in which case the operating device would be arranged to move the eighth intermediate gearwheel K5c in axial directions along the intermediate wheel shaft in order thereby to effect movement of the intermediate gearwheel between the aforesaid states.

Figure 6:
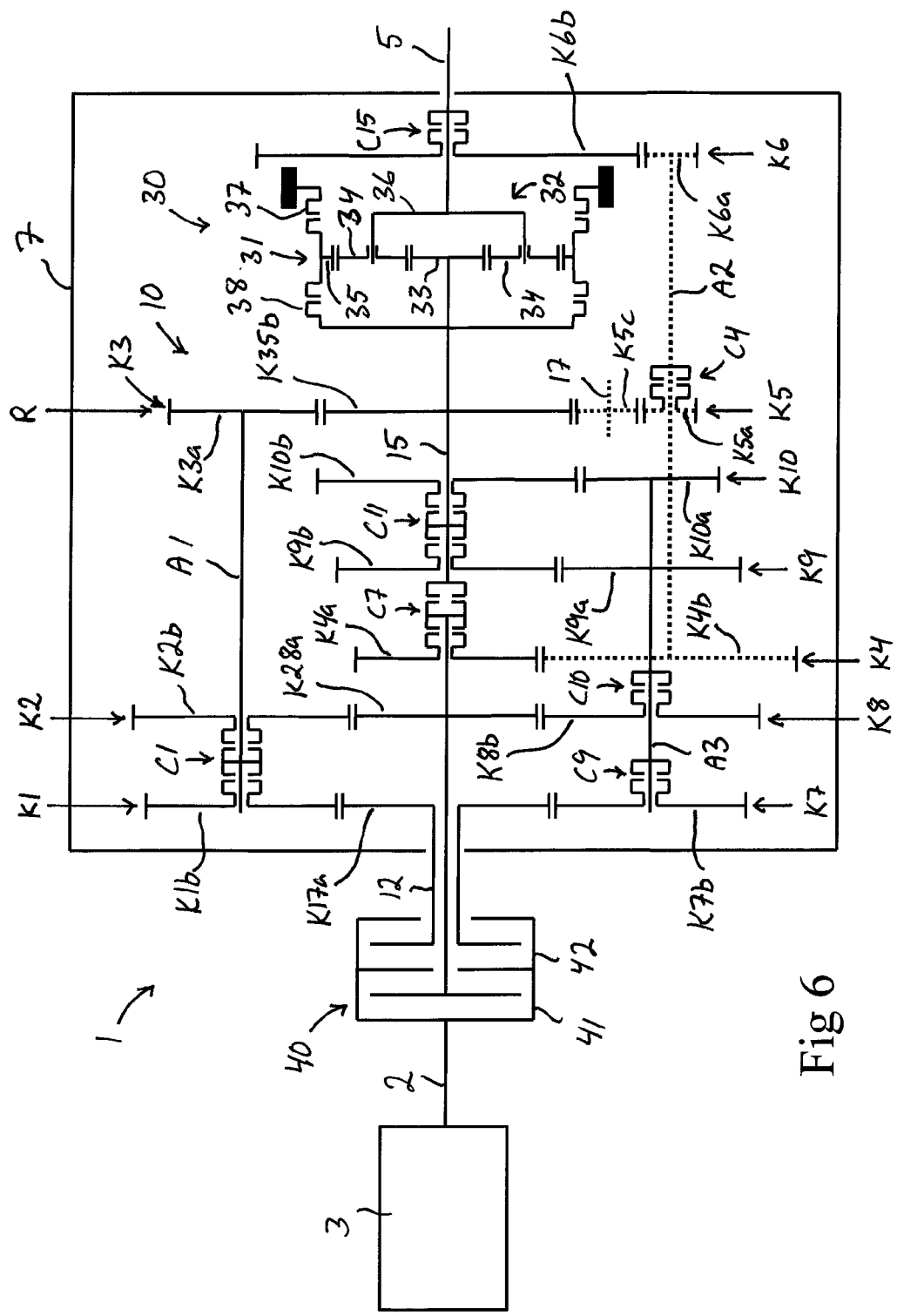
FIG. 6 is a schematic diagram of a transmission system according to a second embodiment of the present invention.

In the embodiment illustrated in FIG. 6 the second power transmission shaft A2 is disconnectable from the mainshaft 15 by means of the clutch device C4 situated on the second power transmission shaft.

In the embodiments illustrated a direct connection can be set up between the first input shaft 11 and the mainshaft 15 by means of one of the clutch devices C6, C7, C14.

Each of the clutch devices C1-C16 may for example take the form of a conventional synchronising clutch or claw clutch of known type or some other suitable type of clutch.

The transmission system according to the invention might of course comprise a main gear unit with fewer or more gear combinations than as depicted in FIGS. 1-8.

To engage a reverse gear, a reversing power transfer path between the driveshaft 2 of the engine and the mainshaft 15 of the main gear unit is established via, in this order, the first input shaft 11, the fourth gear combination K4, the second power transmission shaft A2 and the fifth gear combination K5. In the embodiments in FIGS. 1-6 it is possible to establish not only this first reversing power transfer path but also a second reversing power transfer path between the engine's driveshaft and the mainshaft of the main gear unit via, in this order, the second input shaft 12, the seventh gear combination K7, the third power transmission shaft A3, the eighth gear combination K8, the first input shaft 11, the fourth gear combination K4, the second power transmission shaft A2 and the fifth gear combination K5. These two reversing power transfer paths may be employed alternately by connecting the two input shafts 11, 12 alternately to the engine's driveshaft 2 via the first and second clutch devices 41, 42. Dimensioning the seventh and eighth gear combinations K7, K8 in such a way that the gear ratio on the second reversing power transfer path differs from that on the first reversing power transfer path makes it possible, when reversing, to change between a low reverse gear and a high reverse gear. As the clutch devices 41, 42 are used to effect the change between these reverse gears, this change can take place with no torque interruption.

In the embodiments in FIGS. 1-6 a first set of power transfer paths for forward gears with mutually different gear ratios can be established between the driveshaft 2 of the engine and the mainshaft 15 of the main gear unit via the first input shaft 11 and the gear combinations K2, K3, K8, K9 and K10, and a second set of power transfer paths for forward gears with mutually different gear ratios can be established between the engine's driveshaft and the mainshaft via the second input shaft 12 and the gear combinations K1, K3, K7, K9 and K10. In the embodiment in FIG. 7 a first set of power transfer paths for forward gears with mutually different gear ratios can be established between the driveshaft of the engine and the mainshaft of the main gear unit via the first input shaft 11 and the gear combinations K2, K3 and K7', and a second set of power transfer paths for forward gears with mutually different gear ratios can be established between the engine's driveshaft and the mainshaft via the second input shaft 12 and the gear combinations K1, K3 and K7'. In the embodiment in FIG. 8 a first set of power transfer paths for forward gears with mutually different gear ratios can be established between the driveshaft of the engine and the mainshaft of the main gear unit via the first input shaft 11 and the gear combinations K2, K3, K4, K6" and K8", and a second set of power transfer paths for forward gears with mutually different gear ratios can be established between the engine's driveshaft and the mainshaft via the second input shaft 12 and the gear combinations K1, K3, K6", K7" and K8". The two different sets of power transfer paths may be employed by alternately connecting the first and second input shafts 11, 12 alternately to the engine's driveshaft via the first and second clutch devices 41, 42. It thus becomes possible to effect stepped upshifts and downshifts in the main gear unit 10 with no torque interruption, i.e. without interrupting the power transfer between the engine's driveshaft 2 and the transmission's output shaft 5.

The transmission system according to the invention is particularly intended for use in a heavy motor vehicle, e.g. a bus, a tractor unit or a truck.

The invention is of course in no way confined to the embodiments described above, since a multiplicity of possibilities for modifications thereof are likely to be obvious to one skilled in the art without thereby deviating from the invention's basic concept such as defined in the attached claims.

The invention claimed is:

1. A transmission system for a motor vehicle, comprising:
   first and second input shafts which are mutually coaxial,
   a mainshaft,
   an output shaft connected to the mainshaft,
   a clutch arrangement for connecting alternately said input shafts to a driveshaft,
   a first power transmission shaft provided with at least a first gearwheel, a second gearwheel situated on either of the input shafts, and in engagement with the first gearwheel, a third gearwheel in engagement with a fourth gearwheel situated on the mainshaft,
   a second power transmission shaft parallel with the first power transmission shaft, the second power transmission shaft is provided with at least a fifth gearwheel, a sixth gearwheel situated on either of the input shafts, the fifth and sixth gearwheels being engaged;
   the second power transmission shaft is provided with a seventh gearwheel which is connected or connectable to said fourth gearwheel on the mainshaft via an eighth intermediate gearwheel to allow the establishment of a power transfer path for a reverse gear via these gearwheels; and
   a movable intermediate wheel shaft on which the eighth intermediate gearwheel is fixed axially,
   wherein the eighth intermediate gearwheel is movable with the movable intermediate wheel shaft relative to the seventh gearwheel on the second power transmission shaft and the fourth gearwheel on the mainshaft, to and fro between a disconnecting state in which the eighth intermediate gearwheel is disconnected from the seventh gearwheel on the second power transmission shaft and/or from the fourth gearwheel on the mainshaft, and a connecting state in which the eighth intermediate gearwheel is in engagement with the seventh gearwheel on the second power transmission shaft and with the fourth gearwheel on the mainshaft.

2. A transmission system according to claim 1, further comprising:
   an operating device configured to move the eighth intermediate gearwheel to and fro between the disconnecting state in which the eighth intermediate gearwheel is disconnected from the seventh gearwheel on the second power transmission shaft and/or from the fourth gearwheel on the mainshaft, and the connecting state in which the eighth intermediate gearwheel is in engagement with the seventh gearwheel on the second power transmission shaft and with the fourth gearwheel on the mainshaft.

3. A transmission system according to claim 2, wherein the eighth intermediate gearwheel is movable axially between the states thereof.

4. A transmission system according to claim 3, wherein the operating device is configured to move in axial directions for moving the eighth intermediate gearwheel between the states thereof.

5. A transmission system according to claim 4, further comprising the operating device comprises a pneumatic or hydraulic cylinder including a piston rod, and the intermediate wheel shaft is connected to the piston rod of the hydraulic cylinder.

6. A transmission system according to claim 3, further comprising the eighth intermediate gearwheel is movable on an axially fixed intermediate wheel shaft along which the operating device is configured to move the eighth intermediate gearwheel in axial directions to effect movement of the eighth intermediate gearwheel between the states thereof.

7. A transmission system according to claim 1, further comprising the seventh gearwheel is journalled for rotation on the second power transmission shaft, and the seventh gearwheel is connectable for joint rotation with the second power transmission shaft; a clutch device situated on the second power transmission shaft and the clutch device is configured for connecting the seventh gearwheel with the second power transmission shaft.

8. A transmission system according to claim 1, further comprising a range gear unit connecting the mainshaft to the output shaft.

9. A transmission system according to claim 8, further comprising:
   the first power transmission shaft comprises a countershaft of the transmission system, and
   the second power transmission shaft comprises a bypass shaft via which at least one of the input shafts can be connected to the output shaft to establish a power transfer path from the at least one input shaft to the output shaft without passing through the range gear unit.

10. A transmission system according to claim 9, further comprising the second power transmission shaft is provided with a ninth gearwheel which is in engagement with a tenth gearwheel situated on the output shaft.

11. A transmission system according to claim 9 further comprising:
   the range gear unit comprises a planetary gear including a sunwheel and a planet wheel carrier, the mainshaft is connected, for joint rotation with the sunwheel of the planetary gear, the output shaft is connected for joint rotation with the planet wheel carrier of the planetary gear, and
   the second power transmission shaft extends past, and radially externally to, the planetary gear.

12. A transmission system according to claim 1, further comprising a third power transmission shaft, the first and the third power transmission shafts each comprise a countershaft of the transmission system.

13. A transmission system according to claim 1, further comprising the first and second power transmission shafts each comprise a countershaft of the transmission system.

* * * * *